United States Patent [19]

Asami et al.

[11] Patent Number: 4,546,397
[45] Date of Patent: Oct. 8, 1985

[54] FLEXIBLE MAGNETIC DISC CASSETTE

[75] Inventors: Shojiro Asami; Hiroshi Sumihiro, both of Atsugi, Japan

[73] Assignee: Sony Corporation, Tokyo, Japan

[21] Appl. No.: 446,224

[22] Filed: Dec. 2, 1982

[30] Foreign Application Priority Data

Dec. 3, 1981 [JP] Japan ................... 56-193626

[51] Int. Cl.$^4$ ...................... G11B 5/012; G11B 23/02
[52] U.S. Cl. ................................... 360/99; 360/133
[58] Field of Search ................ 360/133, 132, 60, 97, 360/99

[56] References Cited

U.S. PATENT DOCUMENTS 4,445,157 4/1984 Takahashi ................ 360/133
4,460,930 7/1984 Takahashi ................ 360/60

FOREIGN PATENT DOCUMENTS 2082371 3/1982 United Kingdom ............. 360/133

Primary Examiner—John H. Wolff
Attorney, Agent, or Firm—Hill, Van Santen, Steadman & Simpson

[57] ABSTRACT

A flexible magnetic disc cassette carries a normally closed automatic slide shutter which selectively covers head access holes provided on the cover of the disc cassette. Basically, such disc cassette is designed for use with a disc drive mechanically which carries an automatic shutter opening system. In order to be able to use such cassette with a disc drive having no such automatic shutter opening system, the shutter is arranged to move on said cover to an extended position where the shutter is latched in an extended open position. Apparatus is provided which automatically operates the shutter of the cassette upon insertion of the cassette into the disc drive.

7 Claims, 5 Drawing Figures

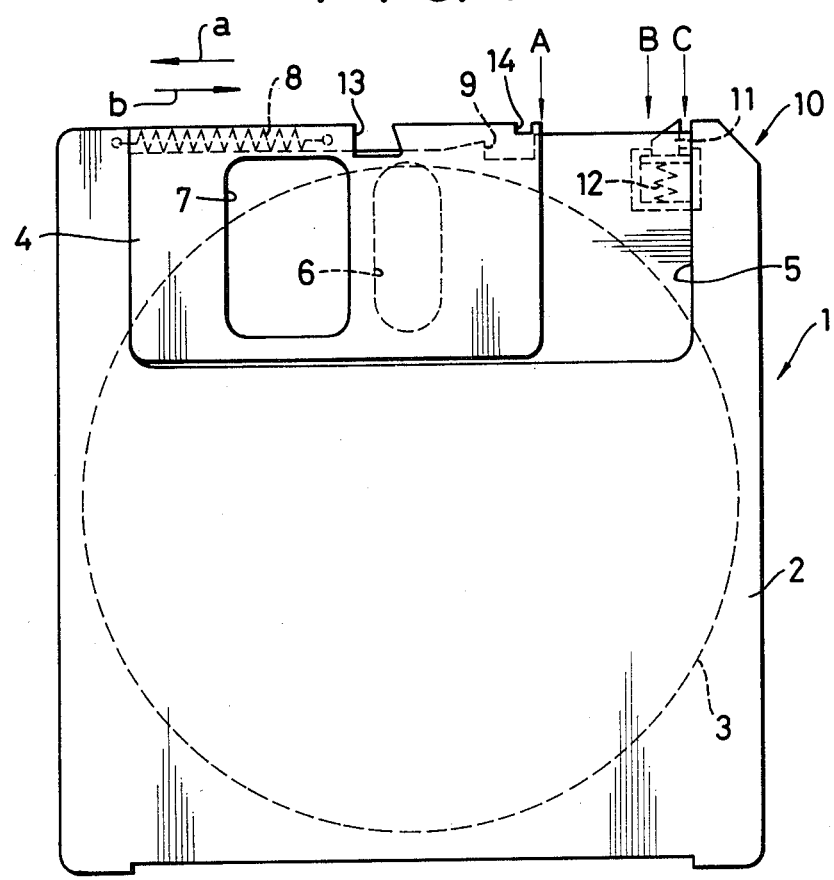
FIG. I
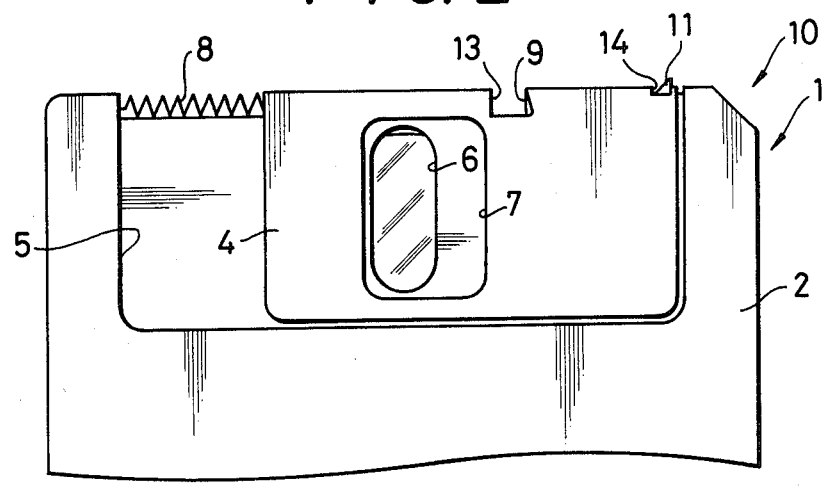
FIG. 2

FLEXIBLE MAGNETIC DISC CASSETTE

BACKGROUND OF THE INVENTION

1. Field of the Invention

This invention relates to a flexible magnetic disc cassette, and more particularly to a flexible magnetic disc cassette with a shutter controlling access to the disc.

2. Description of the Prior Art

It has been known in the prior art that a flexible magnetic disc, when not in use, can be protected from dust or finger prints by providing a slidable shutter on a floppy disc cassette.

For example, a co-pending U.S. application Ser. No. 292,447 filed Aug. 13, 1982, assigned to the same assignee of this application discloses a floppy disc cassette with a manually operable shutter.

In that conventional disc cassette, it has been a common practice that the user first slides the shutter by hand from a closed position to an open position and then inserts the disc cassette into a disc drive apparatus for disc use. After use, he pulls out the disc cassette from the disc drive system and then manually slides the shutter to cover, or close the head access hole.

There has been a strong demand for a system in which, upon the installment of the disc cassette into the disc drive system, the shutter is automatically operated to open the head access hole, and in which the head access hole is automatically closed by means of the shutter when the cassette is pulled out of the drive apparatus.

As a result, there exist two kinds of disc drives; namely, an auto-shutter disc drive and a conventionall manual-shutter disc drive, and two kinds of cassettes are required; namely, a manual-shutter disc cassette and an auto-shutter disc cassette. However, if the problem is raised that while the manual shutter disc cassette can be used in the auto-shutter disc drive, the auto shutter disc cassette could not be used in the manual shutter disc drive apparatus.

SUMMARY OF THE INVENTION

It is therefore a primary object of the present invention to provide a flexible magnetic disc cassette capable of opening and closing an access hole provided on a case in both manual and auto modes.

Another object of the present invention is to provide a flexible magnetic disc cassette which is interchangeable even among magnetic recording/reproducing devices having different drive and shutter mechanisms.

BRIEF DESCRIPTION OF THE DRAWINGS

The above, and other objects, features and advantages of the invention will be apparent in the following detailed description of illustrative embodiments thereof which is to be read in connection with the accompanying drawings in which:

FIG. 1 is a plan view showing a preferred embodiment of a flexible magnetic disc cassette in accordance with the present invention;

FIG. 2 is a partial plan view illustrating the state in which the shutter is self-locked manually;

DESCRIPTION OF THE PREFERRED EMBODIMENT

Figure 3:
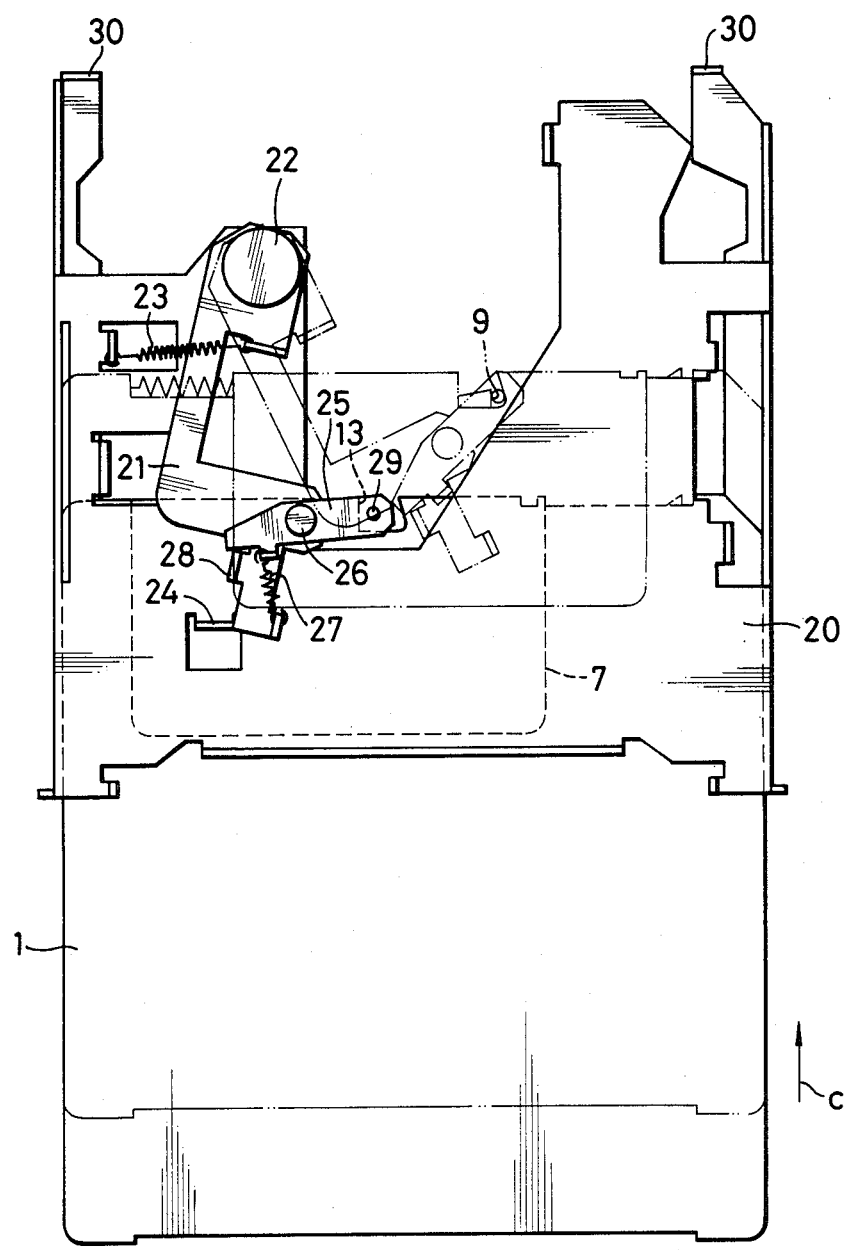
FIG. 3 is a plan view showing a shutter opening mechanism in an auto-shutter disc drive.

Referring now to FIG. 1 which illustrates a preferred embodiment of a flexible magnetic disc cassette in accordance with the present invention, a flexible magnetic disc cassette 1 comprises a case 2 having upper and lower halves, a flexible magnetic disc 3 rotatably accommodated within the case 2, and a slidably mounted shutter 4.

The range of movement of the shutter 4 is limited by a stop 5 formed on the surface of the case 2, and the shutter 4 itself can be moved to three positions; that is, a closed position shown by (A), a non-locked operative position shown by (B), and a locked operative position shown by (C), respectively, in FIG. 1.

Each of the upper and lower halves of the case 2 is provided with a head access hole 6. The shutter 4 is provided with a shutter hole 7 at a position corresponding to the head access hole 6. In this case, the width of the shutter hole is extended so as to permit the head access hole 6 to be opened at the locked operative position (C). Since spring 8 is interposed between the shutter 4 and the case 2, the shutter is always biased in the direction indicated by an arrow "a" in the drawing by means of the spring 8. In other words, the shutter 4 is located at the closed position (A) shown in FIG. 1 by the pressure of the spring 8 in the ordinary state.

As can be seen from FIGS. 1 and 2, the case 2 is provided with a cut-out 9 and a shutter latch 11. The shutter latch 11 biased by spring 12. The shutter 4 is provided with cut-outs 13 and 14. As will be described later, an auto shutter drive pin is inserted into the cutout 13, and the shutter lock, or latch, pin 11 is inserted into the cutout 14. Although not shown in the drawings, the lower half of the case 2 is provided with a drive hole with which a driving disc can be engaged. However, the description with respect of this point is omitted since it is not directly concerned with the subject matter of the present invention.

FIG. 2 shows a condition wherein the shutter 4 is manually latched. With the shutter 4 moved in a direction indicated by an arrow "b" in FIG. 1, the shutter lock pin 11 enters the cutout 14 in the locked operative position (C), and is locked in this position (FIG. 2). In this condition the flexible magnetic disc cassette 1 can be used with a manual shutter disc drive. When the forward end of the shutter lock pin 11 is urged against the pressure of the bias spring 12, the shutter 4 is unlocked and then returned to the closed position (A) by the pressure of the spring 8.

Next, the operation of the auto-shutter disc drive will be explained with reference to FIG. 3 which illustrates a shutter opening mechanism in the auto-shutter disc drive.

In FIG. 3, the shutter opening mechanism has a cassette holder 20 having a space into which the disc cassette 1 is inserted. An L-shaped arm 21 is pivotally mounted on the cassette holder 20 through an axis 22. Since a bias spring 23 is disposed between the cassette holder 20 and the L-shaped arm 21, the arm 21 is always subject to a turning force in the clockwise direction by means of the spring 23. In addition, the L-shaped arm 21 always abuts a stop 24 on at the cassette holder 20. A shutter arm 25 is pivotally mounted on the forward end of the L-shaped arm 21 through an axis 26. A bias spring 27 is disposed between the arm 21 and the shutter arm 25. Thus, the shutter arm 25 always receives a turning force in the counterclockwise direction from the bias spring 27, but the range of movement thereof in an ordinary state is limited by a stop 28 on the L-shaped arm 21. A vertically downwardly-extended shutter drive pin 29 is carried on the shutter arm 25.

In the above arrangement, the tension of the spring 23 is weaker than that of the spring 8 in the disc cassette 1 and the tension of the spring 27 is weaker than that of the spring 23. In addition, the cassette holder 20 is provided with a cassette stop 30 to prevent excess insertion of the disc cassette 1.

In operation, the shutter opening mechanism shown in FIG. 3 is as follows.

When the disc cassette 1 first inserted into the cassette holder 20 in the direction indicated by an arrow "c" in FIG. 3, the shutter drive pin 29 enters the cutout 13 in the shutter 4 which is held in the closed position.

With the disc cassete 1 further pushed in the direction "c", the L-shaped arm 21 is turned in the counter-clockwise direction, since the shutter drive pin 29 is located at the right side of the axis 22. Thus, the shutter drive pin 29 is moved toward the right to move the shutter 4.

As shown by the two-dot chain lines in FIG. 3, the shutter drive pin 29 drops into the cut-out 9 of the case 2 during the course of insertion.

Figure 4:
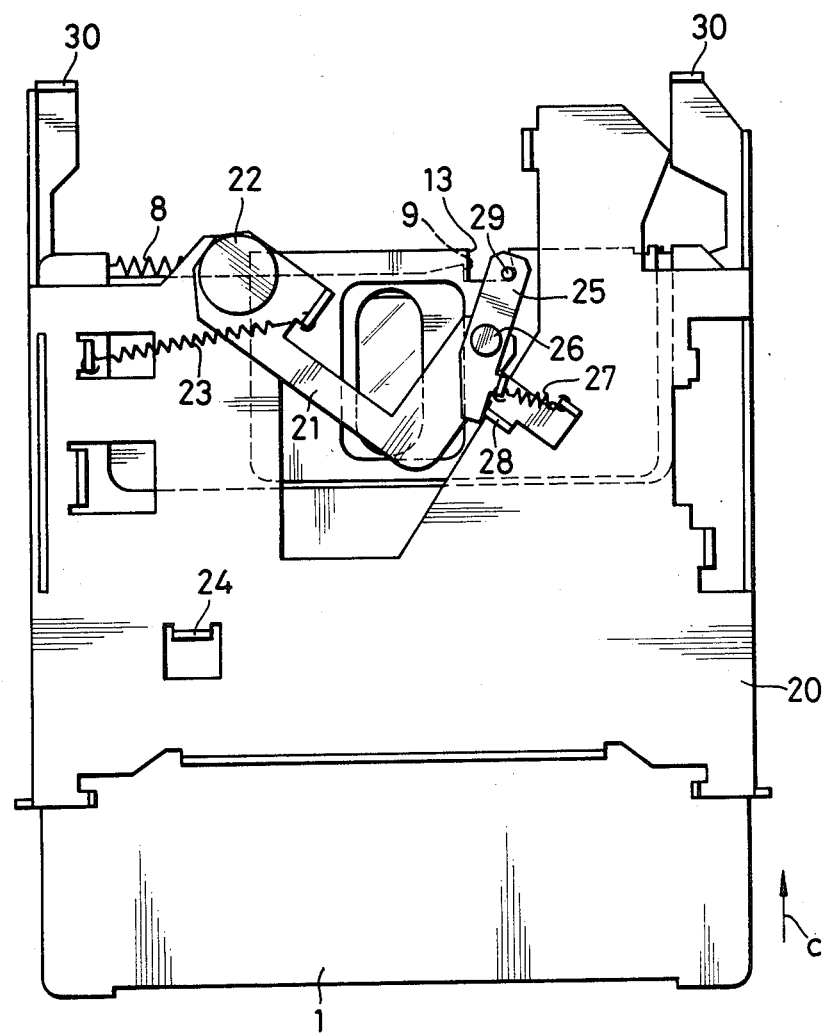
FIG. 4 shows an operation diagram of FIG. 3 used for explaining the operation of a shutter drive pin, when a disc cassette is pushed.

When the disc cassette 1 is still further pushed, the shutter drive pin 29 moves the shutter 4 to the right to a position shortly ahead of the locked operative position, as shown by the solid lines in FIG. 4. An important feature in the above-mentioned operation is that the shutter 4 is not locked due to the shutter drive pin 29.

With the disc cassette 1 still pushed further, the shutter 4 pinches the shutter drive pin 29 by use of the cut-out 9 in the case 2 and the cut-out 13 in the shutter 4, and then is held at the non-locked operative position.

Figure 5:
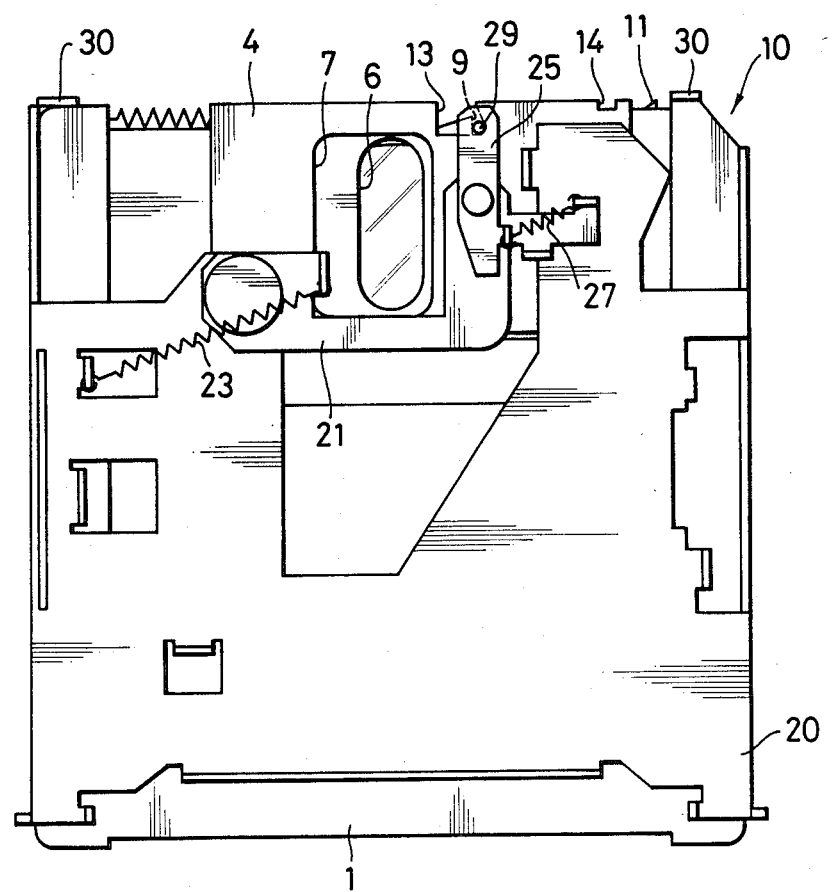
FIG. 5 shows an operation diagram explaining the subsequent automatic operation of the shutter drive pin, when the disc cassette is further pushed.

Thus, the disc cassette will be placed, as shown in FIG. 5, under a state that the recording and reproducing of data to and from the flexible magnetic disc 3 is possible through the head access hole 6 of the disc cassette, since the shutter 4, will be kept at the non-locked operative position by means of the cassette holder 20.

The motion of the shutter drive pin 29 at a time when the disc cassette 1 is pulled out is just opposite to the operation at the time of insertion. With the disc cassette pulled out of the cassette holder 20, the shutter 4 will be returned to the closed position as indicated in FIG. 1.

As explained above, the flexible magnetic disc cassette according to the present invention may be used both in auto and manual drive mechanisms.

While a specific embodiment of the invention has been shown and described in detail to illustrate the application of the inventive principles, it will be understood that this invention may be embodied otherwise without departing from such principles.

We claim as our invention:

1. A flexible magnetic disc cassette for use with a disc drive comprising:
   a cover having upper half and lower half for containing said flexible magnetic disc therebetween;
   an access hole provided on said cover for exposing a portion of said flexible magnetic disc for recording and/or reproducing;
   a shutter slidably mounted on said cover for selectively closing said access hole, said shutter being positionable at respective closed position, non-locked operative position and locked operative position;
   a lock member provided on said cover for locking said shutter at said locked operative position, and said access hole being shielded by said shutter until said shutter is moved to said non-locked operative position from said closed position.

2. A flexible magnetic disc cassette as recited in claim 1, wherein there is provided a spring member which biases said shutter toward said closed position on said cover.

3. A flexible magnetic disc cassette as recited in claim 2, wherein said shutter has an access hole which enables said recording and/or reproducing to said flexible magnetic disc when said shutter is in either said locked operative position or non-locked operative position.

4. A cassette as recited in claim 1 wherein said shutter has a recess which aligns with said last named cover access hole when said shutter is in either of said operative positions.

5. A disc drive mechanism for receiving a disc cassette having a slideable shutter thereon and for sliding the shutter from a closed position to an open position, comprising;
   an opening receiving said cassette and guiding said cassette for longitudinal insertion movement, a shutter sliding means including a first abutment, means biasing said abutment into position for cooperation with said shutter upon insertion of said cassette, a second abutment on said shutter for cooperation with said first abutment and operated by said first abutment to move said shutter to said open position as said cassette is inserted further into operating position in said drive mechanism.

6. A drive mechanism as recited in claim 5 wherein said first abutment is carried by a pivoted arm biased into position to cooperate with said second abutment upon initiation of insertion of the cassette.

7. A drive mechanism as recited in claim 6 wherein biasing means urge said first abutment into firm contact with a third abutment on said cassette as said cassette approaches the fully inserted operative position in said drive mechanism.

* * * * *